US006590354B2

United States Patent
Hein

(10) Patent No.: US 6,590,354 B2
(45) Date of Patent: Jul. 8, 2003

(54) SEAT ADJUSTING SYSTEM HAVING MOTOR WITH INTEGRATED SENSOR AND CONTROL ELECTRONICS

(75) Inventor: David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 22 days.

(21) Appl. No.: 09/973,492

(22) Filed: Oct. 8, 2001

(65) Prior Publication Data

US 2002/0047675 A1 Apr. 25, 2002

Related U.S. Application Data

(60) Provisional application No. 60/241,628, filed on Oct. 19, 2000.

(51) Int. Cl.[7] .................................................. H02P 7/74
(52) U.S. Cl. ........................... 318/34; 318/280; 318/283; 318/286; 318/468; 318/568
(58) Field of Search .......................... 318/34, 286, 468, 318/568, 280, 283

(56) References Cited

U.S. PATENT DOCUMENTS

| 4,264,849 | A |   | 4/1981  | Fleischer et al. |            |
|-----------|---|---|---------|------------------|------------|
| 4,434,468 | A |   | 2/1984  | Caddick et al.   |            |
| 4,510,426 | A |   | 4/1985  | Michaels et al.  |            |
| 4,660,140 | A |   | 4/1987  | Illg             |            |
| 4,706,194 | A | * | 11/1987 | Webb et al.      | 364/424    |
| 4,845,620 | A |   | 7/1989  | Parker           |            |
| 4,853,687 | A |   | 8/1989  | Isomura et al.   |            |
| 5,197,007 | A | * | 3/1993  | Parker           | 364/424    |
| 5,253,138 | A |   | 10/1993 | Droulon et al.   |            |
| 5,319,248 | A | * | 6/1994  | Endou            | 307/10.1   |
| 5,483,853 | A |   | 1/1996  | Moradell et al.  |            |
| 5,561,265 | A | * | 10/1996 | Livshits et al.  | 174/35 C   |
| 5,670,853 | A | * | 9/1997  | Bauer            | 318/286    |
| 5,751,129 | A | * | 5/1998  | Vergin           | 318/467    |
| 5,812,399 | A | * | 9/1998  | Judic et al.     | 364/424.05 |
| 5,822,707 | A | * | 10/1998 | Breed et al.     | 701/49     |
| 5,903,122 | A |   | 5/1999  | Mesnage et al.   |            |
| 5,934,748 | A | * | 8/1999  | Faust et al.     | 297/180.12 |
| 6,198,244 | B1|   | 3/2001  | Hayden et al.    |            |
| 6,339,302 | B1| * | 1/2002  | Greenbank et al. | 318/103    |

* cited by examiner

Primary Examiner—Robert E. Nappi
Assistant Examiner—Tyrone Smith
(74) Attorney, Agent, or Firm—Brooks & Kushman P.C.

(57) ABSTRACT

A seat adjusting system having a motor assembly with an integrated sensor and control electronics assembly for adjusting a vehicle seat. The integrated electronics assembly performs electronic memory seat module functions. The integrated electronics assembly includes a multiplex link for communicating data between the integrated sensor and control electronics assembly and an external switch. The integrated electronics assembly further includes motor control relays positioned between the motors of the motor assembly for controlling the motors to adjust the seat. The integrated electronics assembly also includes seat position sensors for monitoring the position of the seat. In contrast to typical seat adjusting systems having an external electronic memory seat module, the seat adjusting system needs only a minimal set of wires connecting the seat adjusting system to an external switch as the integrated electronics assembly performs electronic memory seat module functions.

13 Claims, 3 Drawing Sheets

SEAT ADJUSTING SYSTEM HAVING MOTOR WITH INTEGRATED SENSOR AND CONTROL ELECTRONICS

CROSS-REFERENCE TO RELATED APPLICATIONS

This application claims the benefit of U.S. Provisional Application No. 60/241,628 filed Oct. 19, 2000.

BACKGROUND OF THE INVENTION

1. Field of the Invention

The present invention relates generally to seat adjusting systems and, more particularly, to a seat adjusting system having a motor assembly with an integrated sensor and control electronics assembly for adjusting a seat in a vehicle.

2. Background Art

For ergonomic and therapeutic reasons, it is desirable to provide position and contour adjustment to a vehicle seat. For example, the fore and aft position of a seat should be adjustable to accommodate occupants of differing heights and body constructions. It is also desirable to raise and lower a seat and tilt it forward and rearward. Furthermore, it is desirable to incorporate an adjustable lumbar support mechanism in the seat back and perhaps adjustment of the bolster contour, head/neck contour, and the like. Vehicles are typically equipped with seat adjusting systems having power assisted devices for accomplishing seat adjustments.

Such power assisted devices include a motor assembly having motors configured to move various structural members of a seat frame. An occupant activates the motors by using controls mounted on the seat. The occupant controls the motors to move the structural members of the seat frame to the occupant's liking.

If the seat is always occupied by the same occupant then that occupant can adjust the controls once and the seat will remain in the desired position. No further adjustment is needed and there is no need to retain position information corresponding to the occupant's preference. However, from time to time, a second occupant may use the seat. When the second occupant uses the seat the seat may need to be adjusted thereby placing the seat in a second position. This destroys the first position set by the primary occupant requiring this occupant to adjust the seat to the first position the next time this occupant uses the seat. This entails activating the controls once again until the seat has been adjusted back to the first position.

Typical seat adjusting systems use an electronic memory seat module to save the occupants the trouble of having to manually activate the controls to restore the seat to desired positions. The memory seat module receives and retains seat position information for each desired position and includes a switch which allows it to return the seat to any of the desired positions, usually at the touch of a single button.

A sensor assembly having seat position sensors provides the seat position information to the memory seat module. Typically the sensors of the sensor assembly are placed on or proximate to the motors of the motor assembly. Each sensor keeps track of what its corresponding motor has done relative to some reference position. This information is conveyed from the sensors to the memory seat module via electrical wiring. Commonly employed sensors include potentiometer, Hall effect sensors, and motor commutator pulse generators.

Potentiometers attach to a motor and produce an analog voltage which varies as the motor rotates. An A/D converter in the memory seat module converts the analog signal into a digital signal for further processing. Hall effect sensors are based on electromagnetic principles and are mounted in motors to produce electronic pulses as the motors rotate. The memory seat module then counts the pulses to keep track of seat position. Motor commutator pulse generators are based on monitoring current through a motor. As the motor rotates, the commutators make and break contact with brushes to create electrical pulses. The memory seat module converts the pulses into digital signals which are then counted to keep track of seat position.

The memory seat module incorporates motor control relays. Each motor control relay is associated with a motor of the motor assembly for controlling the associated motor. The motor assembly further includes a motor assembly connector for connecting wires from the motor assembly to the memory seat module and a sensor assembly connector for connecting wires from the sensor assembly to the memory seat module.

A problem with typical seat adjusting systems is the large amount of wires that are needed to connect the motor and sensor assemblies to the memory seat module. For example, for a motor assembly having three motors and a sensor assembly having three sensors, there needs to be eleven wires connecting the motor and sensor assemblies to the memory seat module. These eleven wires include three wires for communicating sensor signals between the sensors and the memory seat module; two wires for providing power from the memory seat module to the sensors; and three pairs of wires for connecting each motor control relay to a motor.

SUMMARY OF THE INVENTION

Accordingly, it is an object of the present invention to provide a seat adjusting system having a motor assembly with an integrated sensor and control electronics assembly for adjusting a seat in a vehicle.

It is another object of the present invention to provide a seat adjusting system having a motor assembly with an integrated sensor and control electronics assembly in which electronic memory seat module functions are performed by the integrated sensor and control electronics assembly.

It is a further object of the present invention to provide a seat adjusting system having a motor assembly with an integrated sensor and control electronics assembly in which a multiplex link communicates data via the integrated sensor and control electronics assembly between the motor assembly and an external switch.

It is still another object of the present invention to provide a seat adjusting system having a motor assembly with an integrated sensor and control electronics assembly including motor control relays positioned between motors of the motor assembly for controlling the motors to adjust a seat.

It is still a further object of the present invention to provide a seat adjusting system having a motor assembly with an integrated sensor and control electronics assembly and a single connector for connecting the integrated sensor and control electronics assembly to an external switch.

It is still yet another object of the present invention to provide a seat adjusting system having a motor assembly with an integrated sensor and control electronics assembly including sensors for monitoring the position of a seat.

It is still yet a further object of the present invention to provide a seat adjusting system having a motor assembly with an integrated sensor and control electronics assembly including electronics for suppressing electrically conducted or radiated electromagnetic emissions.

In general, the present invention is a seat adjusting system having a motor assembly with an integrated sensor and control electronics assembly for adjusting a vehicle seat. The integrated sensor and control electronics assembly performs electronic memory seat module functions. The integrated sensor and control electronics assembly includes a vehicle multiplex link for communicating data via the integrated sensor and control electronics assembly between the motor assembly and an external switch. The integrated sensor and control electronics assembly further includes motor control relays positioned between the motors of the motor assembly for controlling the motors to adjust the seat. The integrated sensor and control electronics assembly also includes seat position sensors for monitoring the position and other aspects of the seat. In contrast to typical seat adjusting systems having an external electronic memory seat module, the seat adjusting system of the present invention needs only a minimal set of wires connecting the seat adjusting system to an external switch as the integrated sensor and control electronics assembly performs electronic memory seat module functions.

In carrying out the above objects and other objects, the present invention provides a seat adjusting system for adjusting the position of a seat in a vehicle. The system includes a motor assembly having a motor for moving a seat member and an integrated sensor and control electronics assembly integrated with the motor assembly for performing electronic memory seat module functions. The integrated sensor and control electronics assembly includes a sensor for monitoring the motor to generate a sensor position signal indicative of the position of the seat member, and a processor operable for processing the sensor position signal to determine the position of the seat. The processor is further operable for controlling the motor to adjust the position of the seat.

The integrated sensor and control electronics assembly may further include a single or multiple wire multiplex link for communicating data with an external switch accessible to a vehicle operator. The processor is further operable for storing preset seat positions, wherein the processor controls the motor to adjust the position of the seat to a desired preset seat position in response to a corresponding vehicle operator command triggered via the external switch.

The integrated sensor and control electronics assembly may further include a motor control relay for activating the motor. The processor is operable with the motor control relay to control the motor. The motor control relay may be positioned adjacent the motor.

The motor assembly may include a plurality of motors for moving respective seat members, and the integrated sensor and control electronics assembly may include a plurality of sensors for monitoring respective motors to generate sensor position signals indicative of the positions of the seat members. The processor is operable for processing the sensor position signals to determine the position of the seat and for controlling the motors to adjust the position of the seat. The integrated sensor and control electronics assembly further includes a plurality of motor control relays for activating the motors. The integrated sensor and control electronics assembly also include means for suppressing electromagnetic emissions.

The system may include a connector having at least three wires for connecting the integrated sensor and control electronics assembly to the external environment. A first wire connects to an external switch for communicating signals between the integrated sensor and control electronics assembly and the external switch, a second wire connects to a power ground for providing a power ground to the integrated sensor and control electronics assembly, and a third wire connects to a power supply for providing power to the integrated sensor and control electronics assembly.

The system may further include a seat heater for heating the seat. The integrated sensor and control electronics assembly further includes a temperature sensor for monitoring the seat to generate a sensor temperature signal indicative of the temperature of the seat. The processor is further operable for processing the sensor temperature signal to determine the temperature of the seat and for controlling the heater to adjust the temperature of the seat.

The system may further include a ventilation unit for ventilating the seat. The processor is further operable for controlling the ventilation unit to adjust the ventilation of the seat.

The advantages associated with the seat adjusting system of the present invention are numerous. The advantages include: 1) a reduction in system cost; 2) a reduction in package space requirements; and 3) an improvement in system reliability. The cost reduction results from the reduction of the number of wires and connectors used by the seat adjusting system. The package reduction results from moving the motor control relays from an external electronic memory seat module to a location between the motors in the motor assembly. Moving the control relays between the motors frees up packaging space because previously unused packaging space between the motors is being used. The reliability improvement results from the integrated sensor and control electronics assembly performing electronic memory seat module functions; the reduction of the number of interfaces and connections; and the ability to incorporate diagnostics into the motor assembly.

The above objects and other objects, features, and advantages of the present invention are readily apparent from the following detailed description of the preferred embodiment(s) when taken in connection with the accompanying drawings.

DETAILED DESCRIPTION OF THE PREFERRED EMBODIMENT(S)

Figure 1:
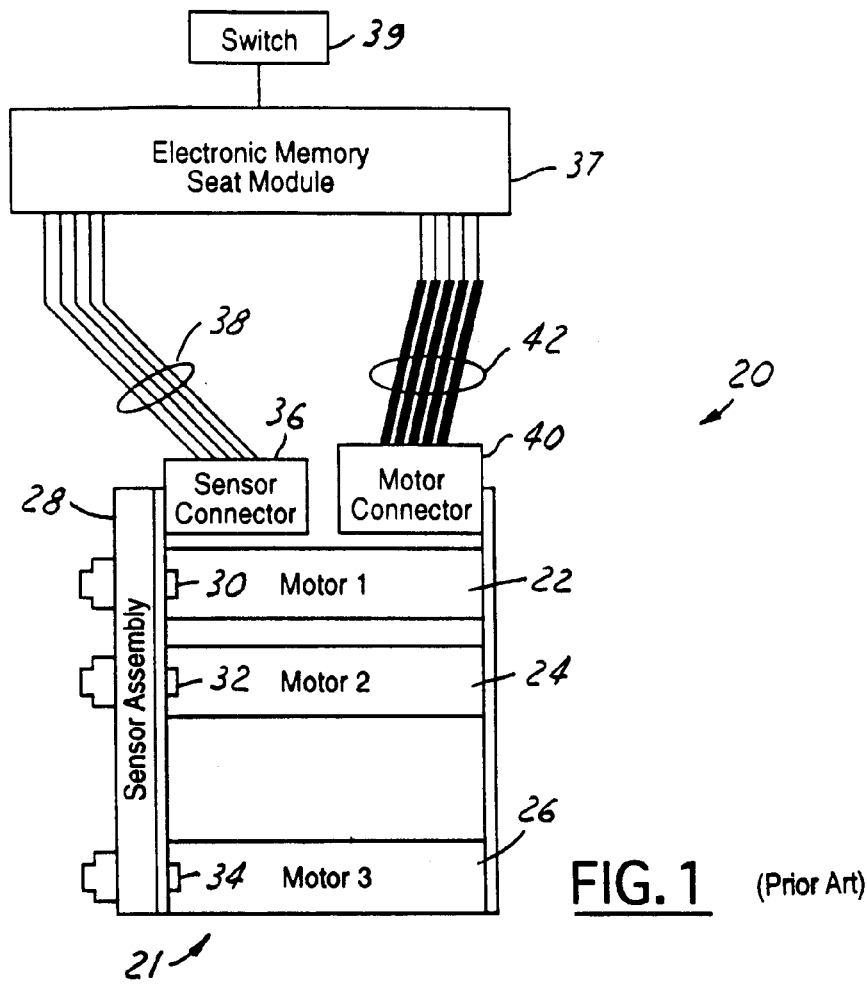
FIG. 1 illustrates a block diagram of an exemplary seat adjusting system.

Referring now to FIG. 1, a block diagram of an exemplary seat adjusting system 20 for adjusting a vehicle seat is shown. Seat adjusting system 20 is positioned in the bottom of a vehicle seat. Seat adjusting system 20 includes a motor assembly 21 and a sensor assembly 28 connected to the motor assembly. Motor assembly 21 includes three motors 22, 24, and 26. Sensor assembly 28 includes three sensors 30, 32, and 34. Each sensor 30, 32, and 34 is associated with a respective motor 22, 24, and 26. Each motor 22, 24, and 26 is associated with a respective structural member of the seat. Motors 22, 24, and 26 operate to drive the seat members between different positions. Sensors 30, 32, and 34 monitor respective motors 22, 24, and 26 as they drive the seat members. Sensors 30, 32, and 34 monitor motors 22, 24, and 26 to generate motor position signals indicative of the motor positions. The motor position signals are indicative of the positions of the seat members and generally, the position of the seat.

A sensor connector 36 connects sensor assembly 28 to an electronic memory seat module 37 which includes a switch 39. Sensor connector 36 includes five wires generally designated as 38 connecting sensor assembly 28 to memory seat module 37. There of the five wires communicate sensor signals from sensors 30, 32, and 34 to memory seat module 37. The other two wires are a ground wire and a voltage wire for providing power from memory seat module 37 to sensor assembly 28.

Memory seat module 37 includes three motor control relays for activating respective motors 22, 24, and 26. A motor connector 40 connects motor assembly 21 to memory seat module 37. Motor connector 40 includes six wires (a pair of wires for each motor) generally designated as 42 for connecting motors 22, 24, and 26 to the motor control relays of memory seat module 37. A disadvantage associated with exemplary seat adjusting system 20 is the large number of wires and separate connections needed for operation.

Figure 2:
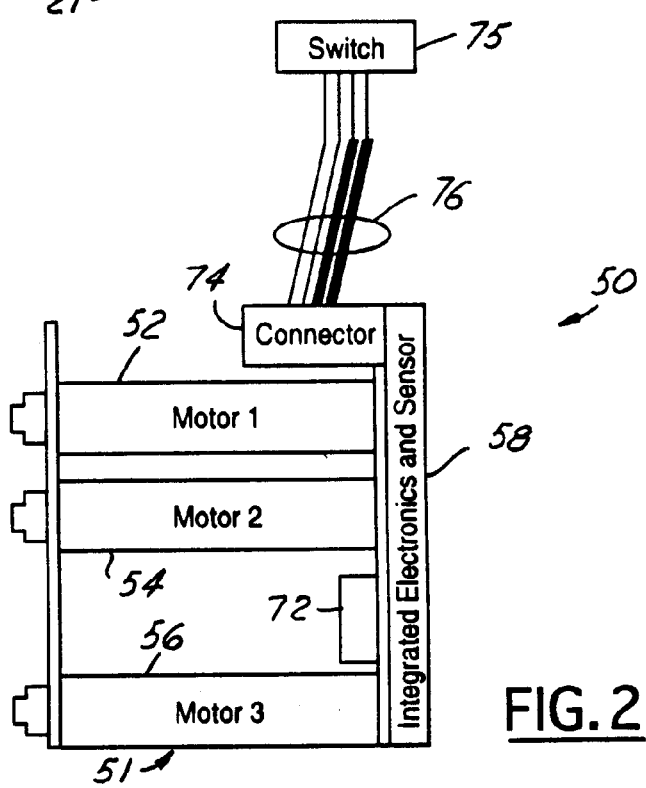
FIG. 2 illustrates a block diagram of a seat adjusting system in accordance with the present invention.
Figure 3:
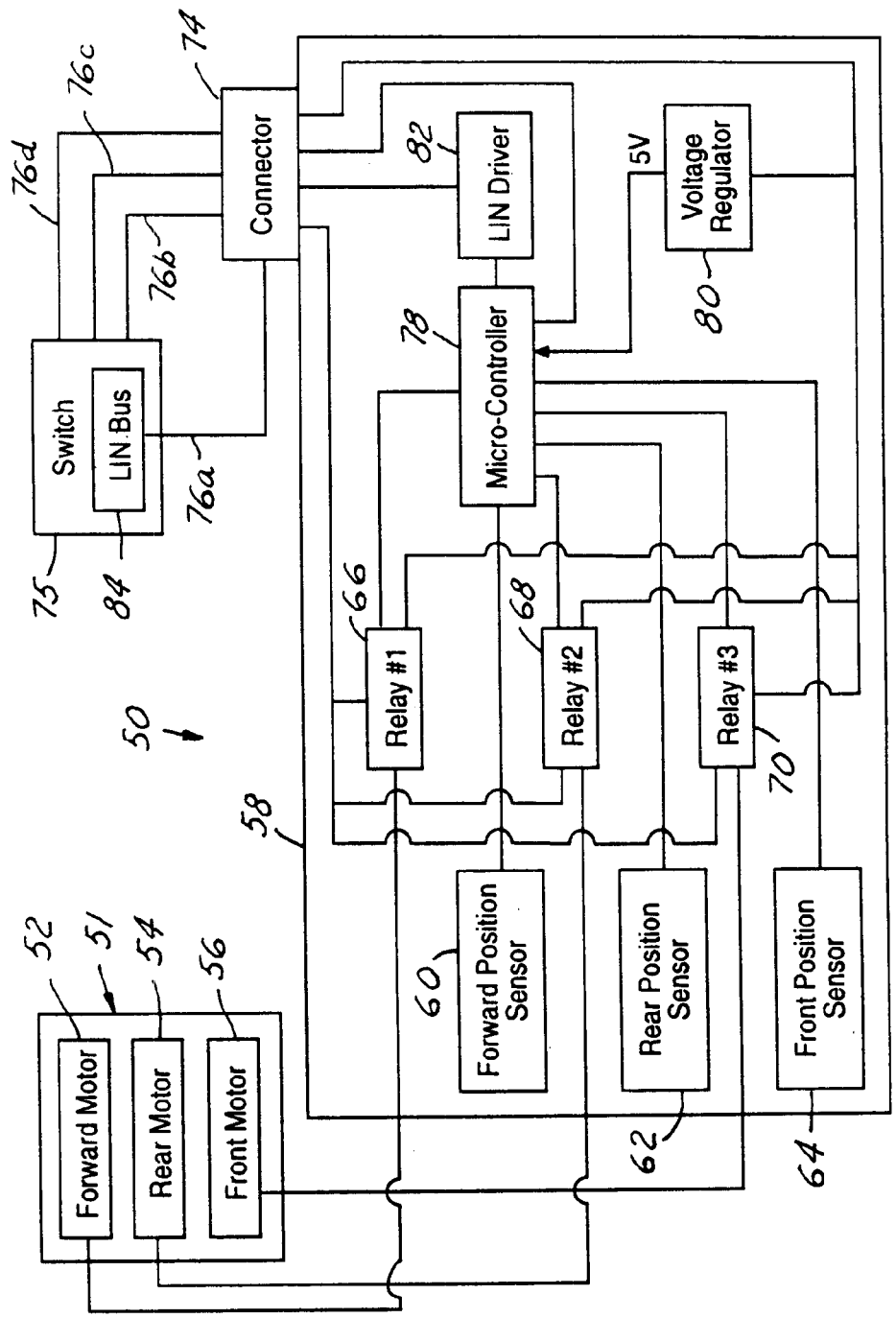
FIG. 3 illustrates a schematic diagram of the seat adjusting system shown in FIG. 2.

Referring now to FIGS. 2 and 3, block and schematic diagrams of a seat adjusting system 50 for adjusting a vehicle seat between various positions in accordance with the present invention are shown. Seat adjusting system 50 is positioned in the bottom of a vehicle seat. Generally, seat adjusting system 50 includes a motor assembly 51 with an integrated sensor and control electronics assembly 58. Seat adjusting system 50 overcomes the disadvantages of exemplary seat adjusting system 20 in that 1) the electronic memory seat module functions are performed internally by integrated sensor and control electronics assembly 58; and 2) a reduced number of wires and connections are needed by seat adjusting system 50 to communicate with the external environment.

Motor assembly 51 includes three motors: a forward motor 52, a rear motor 54, and a front motor 56. Motors 52, 54, and 56 operate to move structural members of the seat. Integrated sensor and control electronics assembly 58 includes three sensors: a forward position sensor 60, a rear position sensor 62, and a front position sensor 64. Each sensor 60, 62, and 64 is associated with a respective motor 52, 54, and 56 for monitoring the positions of the motor. Each sensor 60, 62, and 64 generates sensor position signals indicative of the motor positions which are further indicative of the positions of the seat members and, generally, the position of the seat.

Integrated sensor and control electronics 58 includes motor control relays 66, 68, and 70 contained within a motor control relay housing 72. As shown in FIG. 2, motor control relay housing 72 is positioned between motors 54 and 56.

Integrated sensor and control electronics assembly 58 further includes a micro-controller (processor) 78, a voltage regulator 80, and a LIN driver 82. Micro-controller 78 performs electronic memory sear module functions such as storing preset seat positions, sensor processing functions, motor control functions, and other functions. Micro-controller 78 connects to each of motors 52, 54, and 56 via a respective relay 66, 68, and 70 for controlling the motors. Micro-controller 78 connects to each of sensors 60, 62, and 64 for receiving the sensor position signals. Integrated sensor and control electronics assembly 58 also includes electronics for the suppression of electrically conducted or radiated electro-magnetic emissions.

A single connector 74 connects integrated sensor and control electronics assembly 58 to an external switch 75. External switch 75 is positioned in the vehicle for access by a vehicle operator. Single connector 74 includes four wires generally designated as 76 connecting integrated sensor and control electronics assembly 58 to switch 75.

A first one of the four wires 76a connects a LIN bus 84 of switch 75 to LIN driver 82 of integrated sensor and control electronics assembly 58 via connector 74. Micro-controller 78 connects to LIN driver 82 to communicate multiplex link signals with switch 75 over first wire 76a. The multiplex link signals include switch status information (e.g., recall memory #1 button pressed, seat forward switch pressed, etc.) and diagnostic information.

In order to perform electronic memory seat module functions in response to an operator activating switch 75, micro-controller 78 of integrated sensor and control electronics assembly 58 processes the sensor position signals from sensors 60, 62, and 64 to determine the position and orientation of the seat. Micro-controller 78 communicates motor control signals to relays 66, 68, and 70 (i.e., turn on the relays) for driving motors 52, 54, and 56 and thereby adjusting the position of the seat. Micro-controller 78 monitors the sensor position signals from sensors 60, 62, and 64 as motors 52, 54, and 56 are being driven to adjust the seat position in order to turn off the motors (i.e., turn off the relays) once the desired seat position has been obtained.

A second one of the four wires 76b connects each of relays 66, 68, and 70 via connector 74 to a power ground generally located in switch 75. A third one of the four wires 76c connects each of relays 66, 68, and 70 and voltage regulator via connector 74 to a power supply generally located in switch 75 for receiving electrical current. Micro-controller 78 connects to voltage regulator 80 for receiving a desired voltage from the power supply. A fourth one of the wires 76d connects micro-controller 78 to a signal ground generally located in switch 75.

Figure 4:
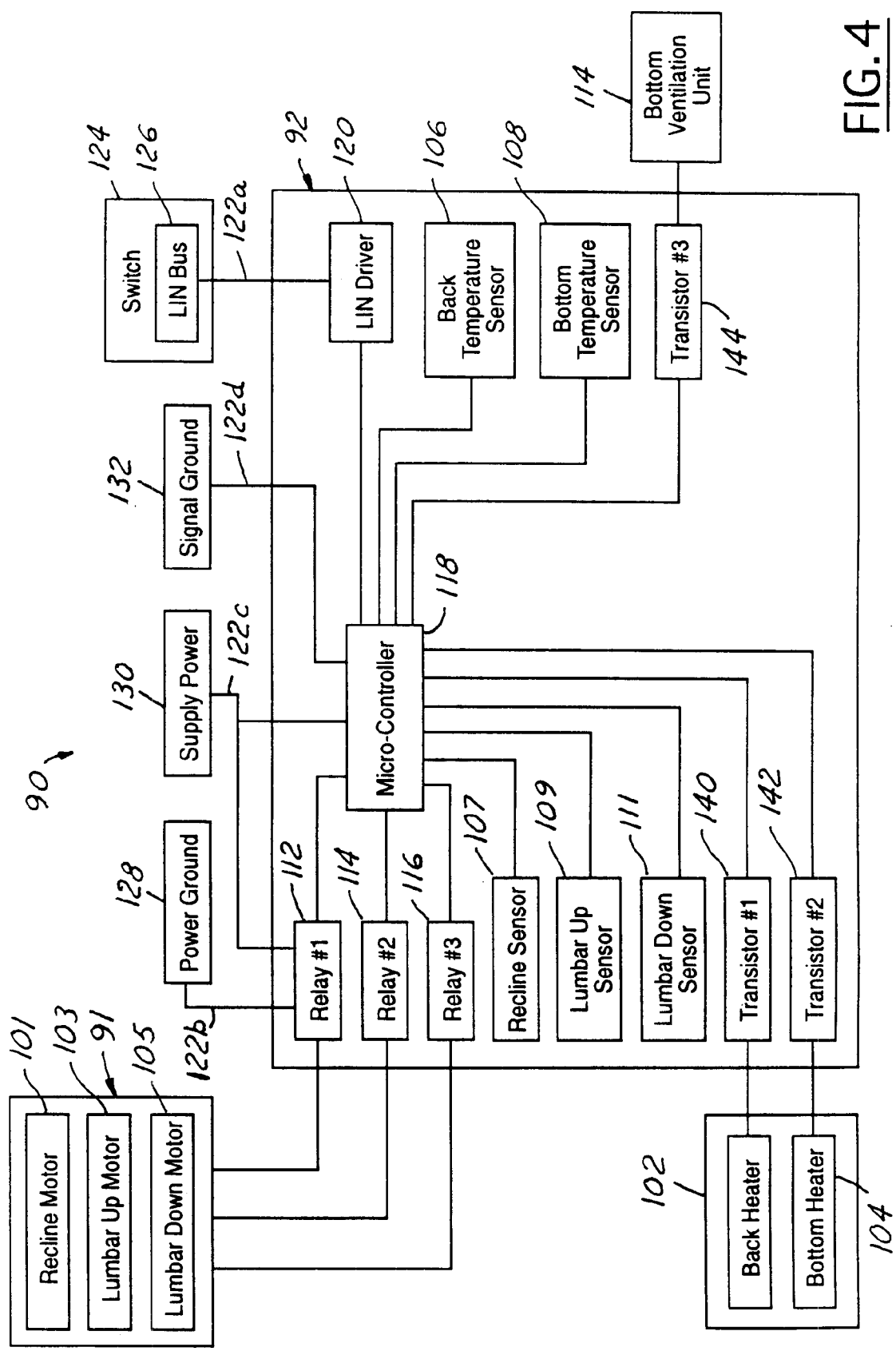
FIG. 4 illustrates a schematic diagram of a seat back adjusting system in accordance with the present invention.

Referring now to FIG. 4, a schematic diagram of a seat back adjusting system 90 for adjusting a vehicle seat back between various positions in accordance with the present invention is shown. Seat back adjusting system 90 is operable for adjusting seat back features such as recline seat back and lumbar positions. Seat back adjusting system 90 is further operable for adjusting the temperature and ventilation associated with the seat back. Seat back adjusting system 90 includes generally the same components as seat adjusting system 50, but further includes heaters, temperature monitors, and a ventilation unit.

Seat back adjusting system 90 includes a seat back motor assembly 91 with an integrated sensor and control electronics assembly 92. Seat back motor assembly 91 includes a recline motor 101, a lumbar up motor 103, and a lumbar down motor 105. Motors 101, 103, and 105 operate to move seat back members. Integrated sensor and control electronics assembly 92 includes three seat back sensors: a recline sensor 107, a lumbar up sensor 109, and a lumbar down sensor 111. Each seat back sensor 107, 109, and 111 is associated with a respective motor 101, 103, and 105 for monitoring the positions of the motor. Each seat back sensor 107, 109, and 111 generates sensor position signals indicative of the motor positions which are further indicative of the positions of the seat members and, generally, the position of the seat back.

Integrated sensor and control electronics assembly 92 further includes three motor control relays 112, 114, and 116 contained within a motor control relay housing (not shown).

Integrated sensor and control electronics assembly 92 also includes a micro-controller 118 and a LIN driver 120. Micro-controller 118 performs electronic memory seat module functions, sensor processing functions, motor control functions, and other functions. Micro-controller 118 connects to each of motors 101, 103, and 105 via a respective relay 112, 114, and 116 for controlling the motors. Micro-controller 118 connects to each of sensors 107, 109, and 111 for receiving the sensor position signals.

A first wire 122a connects LIN driver 120 of integrated sensor and control electronics assembly 92 to a LIN bus 126 of an external switch 124. Micro-controller 118 connects to LIN driver 120 to communicate multiplex link signals with switch 124 over first wire 122a. Such multiplex link signals include a control signal from switch 124 in response to an operator pressing the switch. Such a control signal may be indicative of the operator's desire to move the seat back to a predetermined position.

As before with reference to micro-controller 78, in order to perform electronic memory seat module functions in response to an operator activating switch 124, micro-controller 118 processes the sensor position signals from sensors 107, 109, and 111 to determine the position of the seat back. Micro-controller 118 drives motors 101, 103, and 105 to adjust the position of the seat back. Micro-controller 118 monitors the sensor position signals as motors 101, 103, and 105 are being driven in order to turn off the motors once the desired seat back position has been obtained.

A second wire 122b connects each of relays 112, 114, and 116 to an external power ground 128. A third wire 122c connects each of relays 112, 114, and 116 and micro-controller 118 to an external power supply 130. A fourth wire 122d connects micro-controller 118 to a signal ground 132.

Seat back adjusting system 90 further includes back and bottom heaters 102 and 104 and a bottom ventilation unit 114. Integrated sensor and control electronics assembly 92 includes back and bottom temperature sensors 106 and 108. Temperature sensors 106 and 108 are operable to generate temperature signals indicative of the temperature of the seat bottom and seat back. Integrated sensor and control electronics assembly 92 further includes a pair of transistors 140 and 142 which connect heaters 102 and 104 to micro-controller 118 and a transistor 144 which connects ventilation unit 114 to the micro-controller.

In general, micro-controller 118 performs electronic memory seat module functions to control motors 101, 103, and 105 as a function of the position signals from sensors 107, 109, and 111; to control heaters 102 and 104 as a function of the temperature signals from sensors 106 and 108; and to control bottom ventilation unit 114 in response to operator instructions provided by switch 75 in the form of multiplex link signals via first wire 76a. Multiplex link signals provided by micro-controller 118 may include switch status, heater status, ventilation status, and diagnostic information.

It should be appreciated that seat adjusting system 50 could be modified to include the heating and ventilation devices described with respect to seat back adjusting assembly 90. It should be further appreciated that an integrated sensor and control electronics assembly may be integrated with only a subset of the active elements, i.e., the motors, the heaters, the ventilation unit, etc., and need not be integrated with all of these elements.

Thus it is apparent that there has been provided, in accordance with the present invention, a seat adjusting system having a motor assembly with an integrated sensor and control electronic assembly for adjusting a vehicle seat that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A seat adjusting system for adjusting the position of a seat in a vehicle, the system comprising:

a motor assembly having a plurality of motors for moving respective seat members; and an integrated sensor and control electronics assembly integrated with the motor assembly, the integrated sensor and control electronics assembly including a plurality of sensors for monitoring respective motors to generate sensor position signals indicative of the positions of the seat members, and a processor operable for processing the sensor position signals to determine the position of the seat, the processor further operable for controlling the motors to adjust the position of the seat;

wherein the integrated sensor and control electronics assembly includes a plurality of motor controllers for activating the motors, wherein the processor is operable with the motor controllers to control the motors;

wherein the integrated sensor and control electronics assembly includes a connector having at least three wires in which a first wire connects to an external switch for communicating signals between the integrated sensor and control electronics assembly and the external switch, a second wire connects to a power ground for providing a power ground to the motor controllers and the processor, and a third wire connects to a power supply for providing power to the motor controllers and the processor.

2. The system of claim 1 wherein:

the first wire of the connector of the integrated sensor and control electronics assembly provides a multiplex link for communicating the signals between the integrated sensor and control electronics assembly and the external switch, the external switch being accessible to a vehicle operator.

3. The system of claim 1 wherein:

the integrated sensor and control electronics assembly performs electronic memory seat module functions.

4. The system of claim 3 wherein:

the processor is further operable for storing preset seat positions, wherein the processor controls the motor controllers to control the motors to adjust the position of the seat to a desired preset seat position in response to a corresponding vehicle operator command triggered via the external switch, the external switch being accessible to a vehicle operator.

5. The system of claim 1 wherein:

at least one motor controller is positioned between a pair of motors.

6. The system of claim 1 wherein:

the integrated sensor and control electronics assembly is positioned adjacent the motor assembly.

7. The system of claim 1 further comprising:

a seat heater for heating the seat, wherein the integrated sensor and control electronics assembly further includes a temperature sensor for monitoring the seat to generate a sensor temperature signal indicative of the temperature of the seat, wherein the processor is further operable for processing the sensor temperature signal to determine the temperature of the seat and to control the heater to adjust the temperature of the seat.

8. The system of claim 1 further comprising:

a ventilation unit for ventilating the seat, wherein the processor is further operable for controlling the ventilation unit to adjust the ventilation of the seat.

9. A seat adjusting system for adjusting the position of a seat in a vehicle, the system comprising:

a motor assembly having a plurality of motors for moving respective seat members; and an integrated sensor and control electronics assembly integrated with the motor assembly for performing electronic memory seat module functions, the integrated sensor and control electronics assembly including a plurality of sensors for monitoring the motors to generate sensor position signals indicative of the positions of the seat member, and a processor operable for processing the sensor position signals to determine the position of the seat, the processor further operable with the motor controllers for controlling the motors to adjust the position of the seat, the integrated sensor and control electronics assembly further including a multiplex link for communicating data with an external switch accessible to a vehicle operator;

wherein the integrated sensor and control electronics assembly includes a plurality of motor controllers for activating the motors, wherein the processor is operable with the motor controllers to control the motors;

wherein the integrated sensor and control electronics assembly includes a connector having at least three wires in which a first wire connects to an external switch for communicating signals between the integrated sensor and control electronics assembly and the external switch, a second wire connects to a power ground for providing a power ground to the motor controllers and the processor, and a third wire connects to a power supply for providing power to the motor controllers and the processor.

10. The system of claim 9 wherein:

the integrated sensor and control electronics assembly performs electronic memory seat module functions.

11. The system of claim 10 wherein:

the processor is further operable for storing preset seat positions, wherein the processor controls the motor controllers to control the motors to adjust the position of the seat to a desired preset seat position in response to a corresponding vehicle operator command triggered via the external switch.

12. The system of claim 9 further comprising:

a seat heater for heating the seat, wherein the integrated sensor and control electronics assembly further includes a temperature sensor for monitoring the seat to generate a sensor temperature signal indicative of the temperature of the seat, wherein the processor is further operable for processing the sensor temperature signal to determine the temperature of the seat and to control the heater to adjust the temperature of the seat.

13. The system of claim 9 further comprising:

a ventilation unit for ventilating the seat, wherein the processor is further operable for controlling the ventilation unit to adjust the ventilation of the seat.

* * * * *